United States Patent
Kira et al.

[11] Patent Number: 6,165,246
[45] Date of Patent: Dec. 26, 2000

[54] COPPER-BASE SINTERED SLIDING MATERIAL EXCELLENT IN SLIPPERINESS AND MACHANIABILITY

[75] Inventors: Toshihiko Kira; Hiromi Yokota; Youichiro Kitagawa; Eichi Sato, all of Aichi, Japan

[73] Assignee: Taiho Kogyo Co., Ltd., Toyota, Japan

[21] Appl. No.: 09/331,049

[22] PCT Filed: Oct. 16, 1998

[86] PCT No.: PCT/JP98/04685

§ 371 Date: Jun. 16, 1999

§ 102(e) Date: Jun. 16, 1999

[87] PCT Pub. No.: WO99/20806

PCT Pub. Date: Apr. 29, 1999

[30] Foreign Application Priority Data

Oct. 17, 1997 [JP] Japan ................................ 9-285829

[51] Int. Cl.$^7$ ........................................... C22C 9/00
[52] U.S. Cl. ................. 75/247; 75/235; 75/236; 428/545; 428/552
[58] Field of Search ............................. 75/247, 235, 236; 428/545, 552

[56] References Cited

U.S. PATENT DOCUMENTS

| | | | |
|---|---|---|---|
| 5,114,468 | 5/1992 | Akutsu et al. | 75/234 |
| 5,217,814 | 6/1993 | Kawakami et al. | 428/545 |
| 5,589,652 | 12/1996 | Arato et al. | . |
| 5,824,923 | 10/1998 | Kondoh et al. | . |

FOREIGN PATENT DOCUMENTS

| | | |
|---|---|---|
| 6-271956 | 9/1994 | Japan . |
| 7-224370 | 8/1995 | Japan . |
| 8-253826 | 10/1996 | Japan . |

*Primary Examiner*—Ngoclan Mai
*Attorney, Agent, or Firm*—Armstrong, Westerman, Hattori, McLeland & Naughton

[57] ABSTRACT

In order to make the wear-resistance and machinability of the copper-based sliding material, in which such particles as AlN, $Al_2O_3$, NiB, $Fe_2B$, SiC, TiC, WC, $Si_3N_4$, $Fe_3P$, $Fe_2P$ and/or $Fe_3B$ are dispersed in the matrix consisting of sintered Cu or Cu alloy, the dispersion is performed such that the weight proportion and the average particle diameter of the medium-hardness particles of Hv 500 or more and 1000 or less are greater than those of the high-hardness particles having Hv 1100 or more.

12 Claims, No Drawings

COPPER-BASE SINTERED SLIDING MATERIAL EXCELLENT IN SLIPPERINESS AND MACHANIABILITY

TECHNICAL FIELD

The present invention relates to a copper-based sintered sliding material, and, more particularly, a copper-based sintered sliding material used as bearing parts of a piston-bin bush, an automatic-transmission bush and the like.

BACKGROUND TECHNIQUE

In a large number of patent documents is published the production of a copper-based sintered alloy, in which the copper powder or the copper-alloy powder is mixed with hard powder to improve the wear-resistance and is sintered to produce sliding material. For example, it is published in U.S. Pat. No. 5,279,638 that the wear-resistance against the opposite sliding material having a rough surface is enhanced by means of adding, as the hard particles, $Fe_2P$, $Fe_3P$, FeB, $Fe_2B$, Mo, Co, Co-base self-fluxing alloy, Ni-base self-fluxing alloy, SiC, TiC, WC, $B_4C$, TiN, cubic BN, $Si_3N_4$, $NiO_2$, $ZrO_2$, $Al_2O_3$, Si-Mn, Cu-Si and/or FeS.

In addition, it is disclosed in Japanese Unexamined Patent Publication (kokai) No. 8-25,026 that: AlN has good adhesiveness with the copper-based sintered material and good sliding characteristics and the characteristics of AlN are not impaired by the hard particles listed in the preceding paragraph provided that the amount of addition of these hard particles is less than the amount of addition of AlN. As a result, satisfactory characteristics are obtained.

Furthermore, it is disclosed in Divulgation (Al) WO96/27,685 to add 20% or less in total of $Al_2O_3$, SiC, $SiO_2$, $Fe_3P$, AlN, $Si_3N_4$, TiC, WC, BN, NiB and/or FeB to a copper alloy which contains from 0.1 to 2% of Ag.

Sintered materials generally have surface roughness of from approximately 10 to 50 $\mu$m, and such surface roughness is disadvantageous for forming the lubricating-oil film. The surface roughness of the sintered materials should, therefore, be further decreased. The method for decreasing roughness is usually carried out by machining with a turning tool and then, if necessary, finishing with a grinding wheel.

Although the wear-resistance of sliding materials is enhanced by the addition of the above-mentioned hard particles, when the surface of the sintered alloy is machined, the turning-tool, even a sintered diamond turning-tool having the highest hardness, is detrimentally worn. That is, a new problem is incurred in that the life of the turning tool is seriously shortened.

It is, therefore, an object of the present invention to provide a sintered sliding material, which is based on the addition of hard particles to the copper, and which does not incur the shortening the life of a cutting tool, while maintaining improved sliding characteristics due to the hard particles.

DISCLOSURE OF INVENTION

The AlN, which is a feature of the above-mentioned Japanese Unexamined Patent Publication (kokai) No. 8-25,026, has approximately Hv 1300 of hardness, while the hardness of $Fe_3P$ is approximately Hv 800. In this publication, the wear-resistance is improved by means of adding $Fe_3P$ in an amount smaller than the amount of AlN. The present inventors discovered in subsequent research that the machinability is greatly improved when the $Fe_3P$ amount > the AlN amount under the constant total amount of $Fe_3P$ and AlN, and, when the relationship of the average-particle diameter is established such that the average-particle diameter of $Fe_3P$ > the average-particle diameter of AlN. The present inventors performed experiments with various hard materials and the present invention was, thus, completed.

The present invention resides in a copper-based sintered sliding material having improved sliding characteristics and machinability, in which high-hardness particles of Hv 1100 or more and medium-hardness particles of Hv 1000 or less are dispersed in the matrix consisting of Cu or Cu alloy, and is characterized in that the medium-hardness particles are greater in the weight proportion and in the average particle-diameter than the high-hardness particles.

The present invention is hereinafter described in detail.

Both high-hardness and medium-hardness particles under the meaning of present invention enhance the wear-resistance of the copper-based sintered alloy, when they are included in the alloy as composite members. However, the wear-resistance enhancing effect of the high-hardness particles having Hv 1100 or more is higher than that of the medium-hardness particles having Hv 1000 or less. On the other hand, the medium-hardness particles having Hv 1000 or less do not impair the machinability. However, in order to outstandingly improve the machinability by means of the medium-hardness particles, both the average particle-diameter and the addition amount of the medium-hardness particles should be greater than those of the high-hardness particles. In this way, the wear-resistance is strongly dependent upon the hardness of the hard particles, while the machinability is strongly dependent upon the hardness and the average-particle diameter of the hard particles. These factors are, therefore, set forth in claim 1 in the present invention.

The following table shows both the above described properties with regard to the sintered copper-alloys, which are composite materials of pure copper, AlN (Hv=1300, average particle diameter=8 $\mu$m, 13 $\mu$m), and $Fe_3P$ (Hv=800, average particle diameter=25 $\mu$m).

TABLE 1

| | AlN | | $Fe_3P$ | | | |
|---|---|---|---|---|---|---|
| | Average Particle Diameter $\mu$m | Addition Amount % | Average Particle Diameter $\mu$m | Addition Amount % | Wear of Bearing $\mu$m | Wear of Turning Tool $\mu$m |
| 1 | 8 | 1 | — | — | 4 | 140 |
| 2 | — | — | 25 | 5 | 40 | 30 |
| 3 | 1.3 | 1 | — | — | 25 | 30 |
| 4 | 1.3 | 0.2 | 25 | 5 | 4 | 35 |
| 5 | 8 | 0.2 | 25 | 5 | 2 | 110 |

It turns out from the comparison of ①, ⑤ with ②, ③ and ④ that the presence of coarse AlN particles results in increase in the wear of the turning tool. The addition of $Fe_3P$ alone ② and the addition of AlN fine-particles ③ alone decreases the wear of a turning tool than the case of adding the coarse AlN alone. Furthermore, from the relationship of ①→⑤ and ③→④, it turns out that the wear of a bearing is kept small even when the AlN amount is decreased, provided that the $Fe_3P$ is additionally added. From the above described tendencies, the wear-resistance of a bearing can be enhanced without impairing the wear of a turning tool (machinability), when the AlN fine particles and $Fe_3P$ are co-existent.

In the present invention, high-hardness particles are preferably at least one selected from the group consisting of AlN, $Al_2O_3$, NiB, $Fe_2B$, SiC, TiC, WC and $Si_3N_4$, and, the medium-hardness particles are preferably at least one selected from the group consisting of $Fe_3P$, $Fe_2P$ and Fe 3B. These high-hardness particles and medium-hardness particles have heretofore been used as the hard-particles additives of the copper-based sintered sliding material and they attain stable sliding characteristics. They are, therefore, preferably used in the present invention, as well.

The present inventors measured the hardness of various particles in the copper-based sintered material, in which the dispersed particles are coarsened to enable measurement of the Vickers hardness. The obtained hardness values are shown in Tables 2 and 3. Since these values are virtually not different from those of pure materials, the effects of the present invention can be attained when the specified hardness-relationship is fulfilled. Therefore, any material other than the above specified can be used as the dispersing particles to be dispersed in the sintered alloy in the present invention, provided that the particles of such material have the specified hardness.

High-hardness particles other than the above-mentioned compounds are $SiO_2$, $Cr_2N$, $TiB_2$, FeB, NiB and the like. It is important for realizing the function of the high-hardness particles that they themselves do not wear off during sliding with the opposite hard shaft (Hv 800–900). The above-mentioned $SiO_2$ and the like have Hv 1100 or more of the hardness required for realizing the function.

Meanwhile, medium-hardness particles other than the above-mentioned compounds are $TiSi_2$, $ZrSi_2$, NiP, an inter-metallic compound, hard metals, e.g., Si, Cr, Co and the like, and their alloys. These compounds have Hv 1000 or less of hardness which improves the machinability. Incidentally, the particle diameter of the medium-hardness particles is preferably comparatively large from the view point of a bearing performance.

Furthermore, it is preferable in the present invention that: the addition amount of the high-hardness particles is from 0.01 to 15% by weight relative to the entire copper-based sintered sliding material; the addition amount of the medium-hardness particles is from 0.5 to 20% by weight relative to the entire copper-based sintered sliding material; and the medium- and high- hardness particles are adjusted within the above-mentioned ranges such that the amount of the former is larger than that of the latter. Below the lower limits of these ranges, the wear-resistance of the sintered sliding material is insufficient, while above the upper limits the sintering properties are disadvantageously impaired. More preferably, the addition amount of the high-hardness particles is from 0.1 to 5% by weight relative to the entire copper-based sintered sliding material, while the addition amount of the medium-hardness particles is from 1 to 10% by weight relative to the entire copper-based sliding material.

In addition, it is preferable in the present invention that the average particle-diameter of the high-hardness particles is 0.5 $\mu$m or more and, further, the average particle-diameter of the medium-hardness particles is 5 $\mu$m or more. Here, when the average particle-diameter of the high-hardness particles is less than 0.5 $\mu$m, it becomes difficult to uniformly disperse the particles in the copper alloy with the increase in the particle number under the constant addition amount. The wear-resistance is, thus, lowered and, in addition, it becomes difficult to realize the compatibility and adhesiveness of the copper alloy. As a result, the sliding characteristics become poor. When the average particle-diameter of the medium-hardness particles is less than 5 $\mu$m, the effects of the medium-hardness particles to improve the wear-resistance are not significant. More preferably, the average particle-diameter of the high-hardness particles is 0.8 $\mu$m or more, and, further the average particle-diameter of the medium-hardness particles is 8 $\mu$m or more.

Furthermore, the particle diameter of all the high- and medium-hardness particles is not particularly limited, provided that these particles meet the above-described relationships of the average particle-diameter, and preferably meets the upper and lower limits. For example, a portion of the highhardness particles may have a greater particle-diameter than a portion of the medium-hardness particles. Although the particle-diameter of all particles is not particularly limited, excessively coarseness is not preferable in the light of the strength and machinability of the sintered material. It is, therefore, preferable that the average particle-diameter of the high-hardness particles is 3 $\mu$m or less, particularly 2 $\mu$m or less and, further, the average particle-diameter of the medium-hardness particles is 50 $\mu$m or less, particularly 30 $\mu$m or less.

The matrix, in which the hard particles are dispersed, is the particles of pure copper or copper alloy. The composition of the copper alloy is not particularly limited, provided that the sliding characteristics are higher than the level ordinarily required. For example, as is disclosed in Japanese Unexamined Patent Publication (kokai) 8-25,026 by the present applicant, when the copper-based sliding material, in which Ag is added, is subjected to a wear test in degraded lubricating oil, Ag and S are concentrated on the sliding surface, resulting in termination of corrosion. On the other hand, when Ag is not contained, a chemical reaction of Cu, S and the like occurs and the reaction product dissolves in the lubricating oil, so that a weight loss of the copper alloy is incurred. Although the chemical reaction with S occurs when Ag is contained, since the Ag—S concentrated layer is stably formed on the surface, subsequent corrosion is terminated. This Cu—Ag base or Cu—Pb—Ag base can also be used in the present invention. Preferably, the Ag addition amount is from 0.1 to 5% (weight percentage relative to the copper alloy), more preferably from 0.2 to 2%. Preferably, the Pb addition amount is 30% or less, or 20% or less (weight percentage relative to the copper alloy), more preferably from 1 to 10%.

Furthermore, the following additive elements can be added to a copper alloy in the weight percentage.

Ni: more than 1% and up to 50%, preferably from 5 to 15%

Sn: 20% or less, preferably from 3 to 15%

P: 0.5% or less, preferably from 0.01 to 0.1%

Al: 5% or less, preferably from 0.5 to 3%

Si: 1% or less, preferably from 0.1 to 0.5%

Bi: 1% or less, preferably from 0.1 to 0.5%

Mn: 5% or less, preferably from 0.5 to 3%

Zn: 30% or less, preferably from 5 to 25%

Fe: 10% or less, preferably from 1 to 5%

Sb: 1% or less, preferably from 0.1 to 0.5%

However, the total addition amount is 50% or less. Among these elements, Ni and Zn enhance the sulfurizing resistance of copper and hence the corrosion resistance in the degraded lubricating oil. Pb and Sb as soft components impart the compatibility. P, Al, Si, Mn, Fe and Sb harden the copper matrix and enhance the wear-resistance.

The system, which consists of pure copper-AlN—$Fe_3P$ can be evidently put into practical use. Although no soft metals such as Pb and Sn are contained in this system, the sliding characteristics are better than those of a kelmet grade, provided that the lubricating conditions are relatively favorable.

The particles of copper or copper alloy can be usual atomized powder, crushed powder, electrolytic powder and the like. Their particle diameter is the general size. The average particle diameter of from 10 to 100 μm can be particularly preferably used.

A method for producing the sintered sliding material according to the present invention is hereinafter described. This method is fundamentally the same as the general method described in column 3, lines 21–28 of the specification of U.S. Pat. No. 5,279,638 by the present applicant. However, since the specific gravity of AlN and the like is less than approximately a half that of the copper (alloy) powder, an important point resides in that the revolution number of a V-type blender should be lowered to realize slow mixing so as to uniformly disperse the former and the latter.

The powder mixture of the copper (alloy) powder and the hard particles are spread to a thickness of from approximately 1 mm to a few mm. The powder as spread is sintered. Alternatively, the powder is subjected to such light pressure as to render the non-uniform state of surface into a somewhat even state,which is not, however, essentially a pressed state, and the powder, is sintered. It is preferred that subsequent pressure-application by means of a roll is carried out to decrease the thickness by approximately 50 to 70%; and, further the second sintering is carried out. Preferably, the sintering is carried out at 700–900° C. in reducing atmosphere.

If necessary, the sintering pores of the sintered material are impregnated with resin so as to further improve the sliding characteristics.

The present invention is described more in detail with reference to the examples.

BEST MODE FOR CARRYING OUT THE INVENTION

EXAMPLE 1

The high-hardness particles (AlN), the medium-hardness particles ($Fe_3P$) and the copper or copper-alloy powder shown in Tables 2 and 3 were thoroughly blended by a V-type blender. The copper powder and the copper-alloy powder were atomized powder having 40 μm of average particle-diameter. This powder mixture was spread on a 2-mm thick steel-sheet to form 1.3 mm of thickness. The first sintering was then carried out at 890° C. The rolling was then carried out to reduce the thickness to a ratio of 50%. Subsequently, the second sintering was carried out also at 890° C. A sintered diamond tool was used for surface-finishing to obtain 2 μm of surface roughness.

The resultant sintered materials were subjected to the following tests.

Cylindrical/sheet type friction wear test (1) Tested material: a sheet bearing made of the above described sintered materials (2) Opposite material: Cylinder having 40 mm of diameter: material-JIS SCM420H, the surface roughness—1 μm (3) Load: 98 N (4) Lubrication: liquid paraffin (5) Sliding Distance: 1800 m Machining Test The sheet bearings of the above mentioned sintered materials were machined by means of an NC lathe, in which a sintered diamond cutting tool (0.4 mm of the cutting-edge R) was used in a distance corresponding to 20 km. The wear amount of the turning tool was measured. The machining condition was: 160 m/min of machining speed; 0.03 mmrev of the feed speed; and, no lubrication.

The results of these tests are shown in Tables 2–3. The "particle diameter" shown in the tables indicate the average particle diameter. The maximum particle-diameters of the respective particles are as follows. AlN: 0.5 μm of average particle-diameter—3 μm of maximum particle-diameter; 1.3 μm of average particle-diameter—6 μm of maximum particle-diameter; 2.1 μm of average particle-diameter—10 μm of maximum particle-diameter; 3 μm of average particle-diameter—15 μm of maximum particle-diameter; 8 μm of average particle-diameter—25 μm of maximum particle-diameter. $Fe_3P$: 5 μm of average particle diameter—30 μm of maximum particle-diameter; 25 μm of average particle-diameter—100 μm of maximum particle-diameter; and, 50 μm of average particle-diameter—150 μm of maximum particle-diameter.

In Table 2, the copper-based sintered sliding material according to Comparative Example E has poor wear-resistance but good machinability. Contrary to this, the wear-resistance is greatly improved by the addition of AlN, while the machinability is seriously impaired (Comparative Examples A–C). When Fe 3P is added, a similar tendency as in the case of AlN addition generates. However, the improving effects are not outstanding, and the machinability is kept good.

Contrary to this, the inventive Example Nos. 1 through 30 exhibit both improved wear-resistance and machinability.

TABLE 2

| | | | Material Properties | | | | | | | | | | | | Bearing Performances Wear of Bearing | Machinability Wear of Turning Tool |
|---|---|---|---|---|---|---|---|---|---|---|---|---|---|---|---|---|
| | | High-hardness Fine Particles | | | Medium-hardness Coarse Particles | | | | | | Matrix | | | | | |
| | No. | Kind | Hardness | Particle Diameter | wt % | Kind | Hardness | Particle Diameter | wt % | Cu | Sn | Ni | Zn | Ag | others | μm | Tool μm |
| Examples | 1 | AlN | 1300 | 0.5 | 0.01 | $Fe_3P$ | 800 | 5 | 0.5 | bal | — | — | — | — | — | 15 | 25 |
| | 2 | AlN | 1300 | 1.3 | 0.05 | $Fe_3P$ | 800 | 25 | 1 | bal | — | — | — | — | — | 10 | 27 |
| | 3 | AlN | 1300 | 1.3 | 0.2 | $Fe_3P$ | 800 | 25 | 2 | bal | — | — | — | — | — | 6 | 30 |
| | 4 | AlN | 1300 | 1.3 | 2 | $Fe_3P$ | 800 | 25 | 5 | bal | — | — | — | — | — | 4 | 30 |

TABLE 2-continued

| | | High-hardness Fine Particles | | | Medium-hardness Coarse Particles | | | Matrix | | | | | | Bearing Performances Wear of Bearing | Machinability Wear of Turning |
|---|---|---|---|---|---|---|---|---|---|---|---|---|---|---|---|---|
| No. | Kind | Hardness | Particle Diameter | wt % | Kind | Hardness | Particle Diameter | wt % | Cu | Sn | Ni | Zn | Ag | others | μm | Tool μm |
| 5 | AlN | 1300 | 1.3 | 10 | Fe₃P | 800 | 50 | 15 | bal | — | — | — | — | — | 3 | 35 |
| 6 | AlN | 1300 | 2.1 | 0.3 | Fe₃P | 800 | 25 | 2 | bal | — | — | — | — | — | 3 | 35 |
| 7 | AlN | 1300 | 2.1 | 5 | Fe₃P | 800 | 5 | 7 | bal | — | — | — | — | — | 3 | 40 |
| 8 | AlN | 1300 | 3 | 5 | Fe₃P | 800 | 25 | 10 | bal | — | — | — | — | — | 2 | 40 |
| 9 | AlN | 1300 | 3 | 15 | Fe₃P | 800 | 50 | 20 | bal | — | — | — | — | — | 2 | 48 |
| 10 | AlN | 1300 | 1.3 | 0.2 | Fe₃P | 800 | 25 | 2 | bal | 2 | — | — | — | — | 5 | 30 |
| 11 | AlN | 1300 | 1.3 | 0.2 | Fe₃P | 800 | 25 | 2 | bal | 20 | — | — | — | — | 4 | 32 |
| 12 | AlN | 1300 | 1.3 | 0.2 | Fe₃P | 800 | 25 | 2 | bal | — | 2 | — | — | — | 6 | 33 |
| 13 | AlN | 1300 | 1.3 | 0.2 | Fe₃P | 800 | 25 | 2 | bal | — | 30 | — | — | — | 6 | 36 |
| 14 | AlN | 1300 | 1.3 | 0.2 | Fe₃P | 800 | 25 | 2 | bal | — | — | 5 | — | — | 7 | 30 |
| 15 | AlN | 1300 | 1.3 | 0.2 | Fe₃P | 800 | 25 | 2 | bal | — | — | 40 | — | — | 6 | 30 |

TABLE 3

| | | | High-hardness Fine Particles | | | Medium-hardness Coarse Particles | | | Matrix | | | | | | Bearing Performances Wear of Bearing | Machinability Wear of Turning |
|---|---|---|---|---|---|---|---|---|---|---|---|---|---|---|---|---|---|
| | No. | Kind | Hardness | Particle Diameter | wt % | Kind | Hardness | Particle Diameter | wt % | Cu | Sn | Ni | Zn | Ag | others | μm | Tool μm |
| Examples | 16 | AlN | 1300 | 1.3 | 0.2 | Fe₃P | 800 | 25 | 2 | bal | — | 10 | 10 | — | — | 6 | 32 |
| | 17 | AlN | 1300 | 1.3 | 0.2 | Fe₃P | 800 | 25 | 2 | bal | — | — | — | 0.2 | — | 5 | 31 |
| | 18 | AlN | 1300 | 1.3 | 0.2 | Fe₃P | 800 | 25 | 2 | bal | — | — | — | 5 | — | 5 | 33 |
| | 19 | AlN | 1300 | 1.3 | 0.2 | Fe₃P | 800 | 25 | 2 | bal | 8 | 5 | — | — | — | 6 | 35 |
| | 20 | AlN | 1300 | 1.3 | 0.2 | Fe₃P | 800 | 25 | 2 | bal | 8 | — | 20 | — | — | 7 | 31 |
| | 21 | AlN | 1300 | 1.3 | 0.2 | Fe₃P | 800 | 25 | 2 | bal | 8 | 5 | 10 | — | — | 5 | 33 |
| | 22 | AlN | 1300 | 1.3 | 0.2 | Fe₃P | 800 | 25 | 2 | bal | 8 | — | — | 1 | — | 5 | 34 |
| | 23 | AlN | 1300 | 1.3 | 0.2 | Fe₃P | 800 | 25 | 2 | bal | 8 | 5 | — | 1 | — | 5 | 34 |
| | 24 | AlN | 1300 | 1.3 | 0.2 | Fe₃P | 800 | 25 | 2 | bal | 8 | — | 20 | 1 | — | 5 | 33 |
| | 25 | AlN | 1300 | 1.3 | 0.2 | Fe₃P | 800 | 25 | 2 | bal | 8 | 5 | 10 | 1 | — | 4 | 35 |
| | 26 | AlN | 1300 | 1.3 | 0.2 | Fe₃P | 800 | 25 | 2 | bal | — | 5 | — | 1 | — | 5 | 32 |
| | 27 | AlN | 1300 | 1.3 | 0.2 | Fe₃P | 800 | 25 | 2 | bal | — | — | 10 | 1 | — | 5 | 35 |
| | 28 | AlN | 1300 | 1.3 | 0.2 | Fe₃P | 800 | 25 | 2 | bal | — | 5 | — | 1 | — | 5 | 35 |
| | 29 | AlN | 1300 | 1.3 | 0.2 | Fe₃P | 800 | 25 | 2 | bal | — | — | — | — | 2 Pb | 5 | 28 |
| | 30 | AlN | 1300 | 1.3 | 0.2 | Fe₃P | 800 | 25 | 2 | bal | 8 | 5 | — | 1 | 1 Graphite | 4 | 30 |
| Comparative Examples | A | AlN | 1300 | 8 | 1 | — | — | — | — | bal | — | — | — | — | — | 4 | 140 |
| | B | AlN | 1300 | 8 | 0.2 | — | — | — | — | bal | — | — | — | — | — | 8 | 100 |
| | C | AlN | 1300 | 1.3 | 0.2 | — | — | — | — | bal | — | — | — | — | — | 25 | 30 |
| | D | — | — | — | — | Fe₃P | 800 | 25 | 2 | bal | 5 | — | — | — | 20 Pb | 30 | 25 |
| | E | — | — | — | — | — | — | — | — | bal | 10 | — | — | — | 10 Pb | 40 | 20 |

EXAMPLE 2

Combination of the high-hardeness particles and the medium-hardeness particles was changed in various ways and the test was carried out asnin Example 1. The results are shown in Table 4.

TABLE 4

| | | High-hardness Fine Particles | | | Medium-hardness Coarse Particles | | | | Matrix | | | | | | Bearing Performances | Machinability |
|---|---|---|---|---|---|---|---|---|---|---|---|---|---|---|---|---|
| | | | Hard- | Particle | | | Hard- | Particle | | | | | | | Wear of Bearing | Wear of Turning |
| | No. | Kind | ness | Diameter | wt % | Kind | ness | Diameter | wt % | Cu | Sn | Ni | Zn | Ag | others | μm | Tool μm |
| Examples | 31 | AlN | 1300 | 1.3 | 0.2 | $Fe_2P$ | 1000 | 25 | 2 | bal | | | | | | 4 | 35 |
| | 32 | AlN | 1300 | 1.3 | 0.2 | $Fe_2P$ | 1000 | 25 | 2 | bal | 2 | | | | | 4 | 33 |
| | 33 | AlN | 1300 | 1.3 | 0.2 | $Fe_2P$ | 1000 | 25 | 2 | bal | | 5 | 10 | 1 | | 4 | 35 |
| | 34 | $Al_2O_3$ | 2200 | 1 | 0.2 | $Fe_2P$ | 1000 | 25 | 2 | bal | | | | | | 4 | 45 |
| | 35 | $Al_2O_3$ | 2200 | 1 | 0.2 | $Fe_2P$ | 1000 | 25 | 2 | bal | | 10 | 10 | | | 5 | 42 |
| | 36 | $Al_2O_3$ | 2200 | 1 | 0.2 | $Fe_2P$ | 1000 | 25 | 2 | bal | | 5 | | 1 | | 4 | 48 |
| | 37 | NiB | 1300 | 2 | 0.2 | $Fe_2P$ | 800 | 25 | 2 | bal | | | | | | 6 | 41 |
| | 38 | NiB | 1300 | 2 | 0.2 | $Fe_2P$ | 800 | 25 | 2 | bal | | | 40 | | | 5 | 40 |
| | 39 | NiB | 1300 | 2 | 0.2 | $Fe_2P$ | 800 | 25 | 2 | bal | 8 | 5 | 10 | | | 5 | 40 |
| | 40 | AlN | 1300 | 1.3 | 0.2 | $Fe_2P$ | 800 | 25 | 2 | bal | | | | | | 4 | 38 |
| | 41 | AlN | 1300 | 1.3 | 0.2 | $Fe_2P$ | 800 | 25 | 2 | bal | | | | 1 | | 5 | 36 |
| | 42 | AlN | 1300 | 1.3 | 0.2 | $Fe_2P$ | 800 | 25 | 2 | bal | 8 | 5 | 10 | 1 | | 4 | 36 |
| | 43 | $Fe_2B$ | 1400 | 2 | 0.2 | $Fe_2P$ | 800 | 25 | 2 | bal | | | | | | 5 | 39 |
| | 44 | $Fe_2B$ | 1400 | 2 | 0.2 | $Fe_2P$ | 800 | 25 | 2 | bal | 8 | 5 | | | | 6 | 40 |
| | 45 | $Fe_2B$ | 1400 | 2 | 0.2 | $Fe_2P$ | 800 | 25 | 2 | bal | 8 | | 20 | | | 6 | 42 |
| | 46 | SiC | 3500 | 1 | 0.2 | $Fe_2P$ | 800 | 25 | 2 | bal | | | | | | 6 | 45 |
| | 47 | SiC | 3500 | 1 | 0.2 | $Fe_2P$ | 800 | 25 | 2 | bal | | 30 | | | | 7 | 48 |
| | 48 | SiC | 3500 | 1 | 0.2 | $Fe_2P$ | 800 | 25 | 2 | bal | 8 | 5 | | 1 | | 7 | 44 |
| | 49 | $Si_3N_4$ | 3200 | 2 | 0.2 | $Fe_2P$ | 800 | 25 | 2 | bal | | | | | | 5 | 44 |
| | 50 | $Si_3N_4$ | 3200 | 2 | 0.2 | $Fe_2P$ | 800 | 25 | 2 | bal | 8 | | 10 | 1 | | 5 | 40 |
| | 51 | $Si_3N_4$ | 3200 | 2 | 0.2 | $Fe_2P$ | 800 | 25 | 2 | bal | | | 20 | 1 | | 6 | 40 |
| | 52 | $Si_3N_4$ | 3200 | 2 | 0.2 | $Fe_2P$ | 800 | 25 | 2 | bal | 8 | 5 | 10 | 1 | 1 Graphite | 4 | 45 |

As is also clear from this table, both wear-resistance and machinability are improved in the inventive Example Nos. 31–52.

INDUSTRIAL APPLICABILITY

As is explained hereinabove, the wear-resistance and the machinability, which is measured in terms of the wear amount of a turning tool, can be compatible at an excellent level in the sintered copper-alloy sliding material according to the present invention.

We claim:

1. A copper-based sintered sliding material having improved sliding characteristics and machinability, comprising high-hardness particles of Hv 1100 or more and medium-hardness particles of Hv 1000 or less dispersed in the matrix consisting of Cu or Cu alloy, characterized in that said medium-hardness particles are greater in weight proportion and in average particle diameter than said high-hardness particles.

2. A copper-based sintered sliding material having improved sliding characteristics and machinability according to claim 1, characterized in that said high-hardness particles are at least one selected from the group consisting of AlN, $Al_2O_3$, NiB, $Fe_2B$, SiC, TiC, WC and $Si_3N_4$, and, said medium-hardness particles are at least one selected from the group consisting of $Fe_3P$, $Fe_2P$ and $Fe_3B$.

3. A copper-based sintered sliding material having improved sliding characteristics and machinability according to claim 2, characterized in that the addition amount of said high-hardness particles is from 0.01 to 15% by weight relative to the entire copper-based sintered sliding material, and the addition amount of said medium-hardness particles is from 0.5 to 20% by weight based on the entire copper-based sintered sliding material.

4. A copper-based sintered sliding material having improved sliding characteristics and machinability according to claim 3, characterized in that the average particle-diameter of said high-hardness particles is 0.5 μm or more, and, the average particle-diameter of said medium-hardness particles is 50 μm or less.

5. A copper-based sintered sliding material having improved sliding characteristics and machinability according to claim 4, characterized in that the average particle-diameter of said high-hardness particles is 3 μm or less, and, the average particle-diameter of said medium-hardness particles is 5 μm or more.

6. A copper-based sintered sliding material having improved sliding characteristics and machinability according to claim 1, the Cu alloy contains from 0.1 to 5% by weight of Ag.

7. A copper-based sintered sliding material having improved sliding characteristics and machinability according to claim 1, wherein the Cu alloy contains, by weight percentage, one or more of:

more than 1% and 50% or less of Ni;

20% or less of Sn;

0.5% or less of P;

5% or less of Al;

1% or less of Si;

30% or less of Pb:

1% or less of Bi;

5% or less of Mn;

30% or less of Zn;

10% or less of Fe; and,

1% or less of Sb, the total amount being 50% or less.

8. A copper-based sintered sliding material having improved sliding characteristics and machinability according to claim 1, characterized in that the material is sintered on a backing metal under the state of non-pressure application or essentially non-pressure application.

9. A copper-based sintered sliding material having improved sliding characteristics and machinability according to claim 1, characterized in that the addition amount of said high-hardness particles is from 0.01 to 15% by weight relative to the entire copper-based sintered sliding material, and the addition amount of said medium-hardness particles is from 0.5 to 20% by weight based on the entire copper-based sintered sliding material.

10. A copper-based sintered sliding material having improved sliding characteristics and machinability according to claim 9, characterized in that the average particle-diameter of said high-hardness particles is 0.5 $\mu$m or more, and, the average particle-diameter of said medium-hardness particles is 50 $\mu$m or less.

11. A copper-based sintered sliding material having improved sliding characteristics and machinability according to claim 10, characterized in that the average particle-diameter of said high-hardness particles is 3 $\mu$m or less, and, the average particle-diameter of said medium-hardness particles is 5 $\mu$m or more.

12. A copper-based sintered sliding material having improved sliding characteristics and machinability according to claim 7, wherein the Cu alloy contains 20% or less of Pb.

* * * * *